United States Patent [19]
Guillerot et al.

[11] 4,308,535
[45] Dec. 29, 1981

[54] PROCESS AND SYSTEM FOR THE VISUAL DISPLAY OF MOVING TARGETS

[75] Inventors: Jean-Claude Guillerot; Michel Delauney, both of Paris, France

[73] Assignee: Thomson-CSF, Paris, France

[21] Appl. No.: 86,429

[22] Filed: Oct. 19, 1979

[30] Foreign Application Priority Data

Oct. 24, 1978 [FR] France ............... 78 30203

[51] Int. Cl.³ ............... G01S 7/04
[52] U.S. Cl. ............... 343/5 NQ
[58] Field of Search ............... 343/5 NQ

[56] References Cited

U.S. PATENT DOCUMENTS

| | | | |
|---|---|---|---|
| 3,987,442 | 10/1976 | McLeod, Jr. | 343/5 NQ X |
| 4,062,011 | 12/1977 | Preston et al. | 343/5 NQ X |
| 4,095,224 | 6/1978 | Dounce et al. | 343/5 NQ X |
| 4,117,538 | 9/1978 | Shrader et al. | 343/5 NQ X |
| 4,132,990 | 1/1979 | DiDomizio et al. | 343/5 NQ X |
| 4,137,533 | 1/1979 | Briechle et al. | 343/5 NQ X |
| 4,153,899 | 5/1979 | Taylor, Jr. | 343/5 NQ X |

Primary Examiner—Malcolm F. Hubler
Attorney, Agent, or Firm—Karl F. Ross

[57] ABSTRACT

In a moving-target indicator in which the pulse-repetition period of an associated Doppler radar is subject to variation, incoming echo pulses appearing in the output of an i-f stage of the radar receiver are demodulated with the aid of two coherent reference signals in relative quadrature and the results are digitized for transmission over two parallel channels. In each channel, digitized signals corresponding to two consecutive echoes in a given range cell are subtracted from each other to provide a pair of difference signals which are passed through a weighting device for multiplication by factors which are trigonometric functions of a selected Doppler frequency and of the difference between the actual repetition period and a theoretical constant value of that period. The weighted signals are subjected to further filtering before being utilized for further processing or display.

7 Claims, 2 Drawing Figures

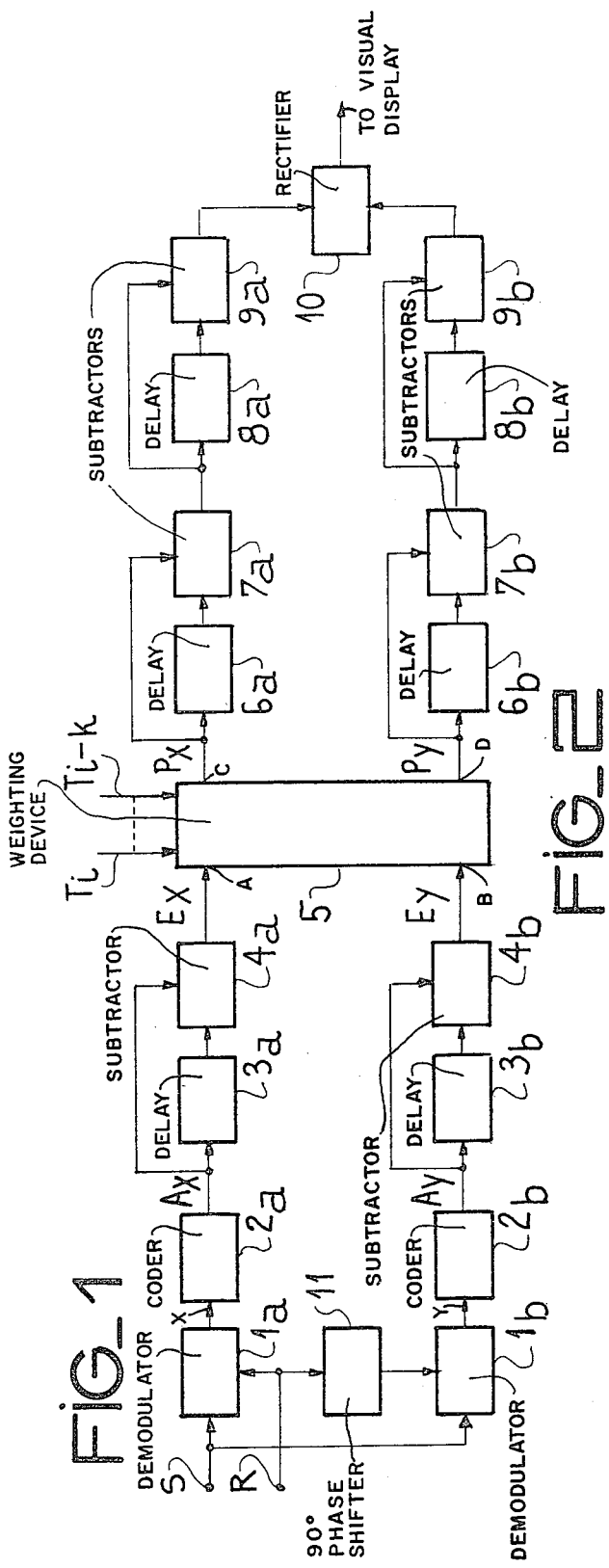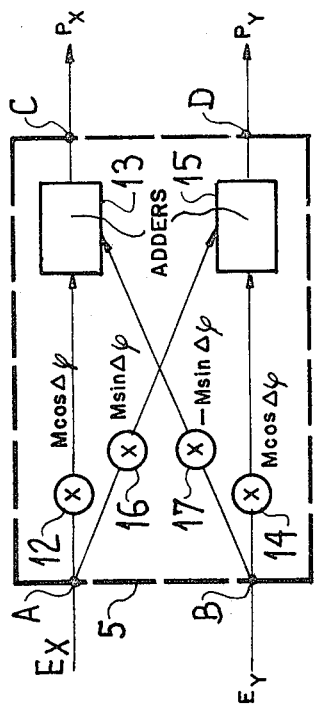

PROCESS AND SYSTEM FOR THE VISUAL DISPLAY OF MOVING TARGETS

FIELD OF THE INVENTION

The present invention relates to the visual display of moving targets in variable-repetition-period radar equipment.

BACKGROUND OF THE INVENTION

The expression "visual display of moving targets" is understood to mean visualizing without major gaps in the useful radial-velocity range of targets, the moving echoes belonging to a particular Doppler frequency band while eliminating as far as possible the fluctuating fixed echoes and their fluctuations caused by the possible rotation of the antenna as well as by low-velocity clutter.

In order to obtain this better visual display the repetition frequency and thus the duration of the pulse-repetition period of the Doppler radar in question is varied.

It is known that in a Doppler radar certain velocities are said to be blind for certain values of the pulse-repetition period. By varying the value of this repetition period from one occurrence to the next, certain targets which were invisible reappear while the fixed echoes continue to be eliminated no matter what the value of the repetition period. However, this variation of the repetition period also has the effect of significantly reducing the degree of attenuation of the low Doppler frequencies, in particular those close to zero.

According to a known system, the spread of the spectrum of the fixed echoes caused by the variation of the repetition frequency in electromagnetic detection equipment is compensated by forming the useful signal from a target on the basis of the difference between the signals successively received from that target and by forming a weighted sum of these signals with weighting factors selected in such a way as to return the signals to the values which they would have had in the absence of any variation in the repetition frequency.

In such a system, signals in relative quadrature from two lock-in detectors are preferably digitally sampled. In each of the channels in question, the so-called sine channel and the so-called cosine channel, two samples are taken per echo and are stored in such a way that samples corresponding to three successive recurrences are simultaneously available.

The differences between the three thus defined signals are applied to a weighting device which comprises two multipliers with variable coefficients which are a function of the recurrence in question. The signals from these weighting devices are summed and then processed in known manner in a filtering and detection device.

Thus, in that prior-art process and system, weighting is performed on two different signals which must be delayed one relative to the other so that the weighted signals corresponding to the same distance can be summed. This makes it necessary to have a supplementary memory in each channel, which increases equipment costs. Moreover, it has been found that the desired rejection of low-frequency echoes was not very satisfactory.

OBJECT OF THE INVENTION.

The object of our present invention is to provide a simplified signal-processing method and system requiring only a single weighting operation to be performed on a given signal difference, thereby avoiding the need for storage of a signal for the period of a recurrence and also eliminating the weighting operation which would have to be carried out on the delayed signal. While simplifying the process and facilitating its structural implementation. Our invention aims at providing results at least equivalent to those obtained by the prior art.

SUMMARY OF THE INVENTION

One aspect of our present invention relates to a method of processing incoming echo signals from a receiver of a Doppler radar of the aforementioned type, transmitting outgoing pulses with a time-varying pulse-repetition period, according to which incoming echo signals from a given range cell of the radar are demodulated in a manner known per se with the aid of two coherent reference signals in relative quadrature, the demodulation products being fed to two parallel channels. Two such demodulation products, derived from echo signals that are received in consecutive pulse-repetition periods, are subtracted from each other in each channel to produce a respective difference signal. Concurrently produced difference signals of both channels are jointly weighted with factors which are trigonometric functions of a selected Doppler frequency f and of a numerical difference between a current pulse-repetition period and a predetermined value, namely a theoretical constant duration of such a repetition period. The signals so weighted are then combined into a control signal for a moving-target display in which the effects of the variations of the pulse-repetition period are substantially compensated at least for the selected Doppler frequency f.

According to a more particular feature of our invention, each of the concurrently produced difference signals is multiplied in a weighting device with a sine and a cosine function of a phase difference $\Delta\phi$ which is dependent on the selected frequency f and on the aforementioned numerical difference, with algebraic addition of multiplication products of both difference signals in each channel.

BRIEF DESCRIPTION OF THE DRAWING.

The above and other features of the invention will be better understood from the following description given in connection with the accompanying drawing in which:

FIG. 1 is a diagram of a signal-processing system according to the invention; and FIG. 2 is a diagram of a weighting device used in that system.

DETAILED DESCRIPTION.

In the aforedescribed conventional system for visualizing targets in a Doppler radar with variable repetition periods, the useful video signal is derived from a combination of the differences of signals sampled in pairs at successive recurrences and a weighted sum is formed from these differences with time-variable weighting factors as a function of the variation in the repetition periods.

To simplify operations and reduce the necessary circuitry, our present invention no longer uses a weighted summation of the differences and instead provides for only a single weighting operation on a single signal difference obtained over two successive repetition periods.

The selected weighting factor, which is variable as a function of the values of the last repetition period, can be either real or complex. In case the factor is complex, this involves subjecting the vector representing the instant video signal to a homothetic transformation followed by a rotation in such a way that the vector obtained at the output of the system is equipollent to the "ideal" vector which would be received at the input of the system in the presence of a pure Doppler frequency for which compensation is to be achieved. In other words, the corrected vector would have the same amplitude and phase as the ideal vector. In case the weighting factor is real, the vector in question undergoes no homothetic transformation.

The device in which weighting takes place is advantageously positioned between two filtering devices which cancel out the zero frequency. The elimination of the Doppler zero frequency is carried out in the first of these filtering devices, so that there is no disturbance due to possible defects in the weighting. Moreover, the compensation remains effective for frequencies close to that chosen.

According to another feature of our invention, the weighting device can be followed by a filtering device of random construction having a rejection zone which contains the Doppler frequency f to which the compensation system is adjusted. After selecting the frequency f for which the compensation is to be effected, the weighting factors are calculated in the following manner:

Reference is made to signals $U_{i-1}$ and $U_i$ which are applied to the filtering device positioned upstream of the weighting device and which are received at successive recurrences, here at recurrences i-1 and i; their difference will be supplied by the filtering device. These signals can be written:

$$U_i = A e^{j2\pi f t_i} \qquad (1)$$

$$U_{i-1} = A e^{j2\pi f t_{i-1}} \qquad (2)$$

where A is a constant and $t_i = t_o + T_1 + T_2 + \ldots T_i$, the symbols $T_1$ etc. representing successive repetition periods.

The difference between the two above signals is written:

$$\begin{aligned}
U_{i-1} - U_i &= A e^{j2\pi f t_{i-1}} - A e^{j2\pi f t_i} \qquad (3)\\
&= A e^{j2\pi f t_{i-1}} [1 - e^{j2\pi f(t_i - t_{i-1})}]\\
&= A e^{j2\pi f t_{i-1}} [1 - e^{j2\pi f T_i}]\\
&= 2j A e^{j2\pi f t_{i-1}} e^{j\pi f T_i} \left[ \frac{e^{-j\pi f T_i} - e^{j\pi f T_i}}{2j} \right]\\
&= 2j A e^{j2\pi f t_{i-1}} \cdot e^{j\pi f T_i}(-\sin \pi f T_i)
\end{aligned}$$

The last expression represents the amplitude of the signal difference supplied by the first filtering device and it can be seen that it is modulated by the term $\sin \pi f T_i$. If it is assumed that the repetition period has a constant value $T_m$, there is no further modulation.

If according to a feature of our invention we multiply the vector difference of equation (3) by a factor $M = \sin \pi f T_m / \sin \pi f T_i$, a constant-amplitude vector is again obtained. It is the value M which represents the real part of the weighting factor.

The imaginary part of this factor is determined by considering the phase of the signals $U_i$ and $U_{i-1}$.

The difference of the signals in question has the form:

$$U_{i-1} - U_i = -2j A e^{j2\pi f t_{i-1}} \cdot e^{j\pi f T_i} \sin \pi f T_i \qquad (4)$$

and can be written:

$$U_{i-1} - U_i = -2j A e^{j2\pi f(t_o + T_1 + T_2 \ldots T_{i-1})} e^{j\pi f T_i} \sin \pi f T_i \qquad (5)$$

Under the same conditions as hereinbefore, if $T_m$ represents the duration of an invariable repetition period, it is possible to write the above expression in the form:

$$U_{i-1} - U_i = -2j A e^{2\pi f} \left[ t_o + (i-1)T_m + \frac{T_m}{2} \right] \sin \pi f T_m; \qquad (6)$$

by equating the two expressions (5) and (6) for the phase, to within $2\pi f$, we obtain:

$$t_o + T_1 + T_2 \ldots T_{i-1} + \frac{T_i}{2} = t_o + (i-1)T_m + \frac{T_m}{2} \qquad (7)$$

The phase-modulation factor which has to be applied to the signal so that the weighted signal has a phase identical to that of the vector difference with a constant repetition period is thus given by:

$$\phi = 2\pi f \left[ (i-1) T_m + \frac{T_m}{2} - \sum_{k=1}^{k=i-1} T_k - \frac{T_i}{2} \right] \qquad (8)$$

On the basis of this formula, it is possible to determine the phase increment to be applied from one period to the next, namely:

$$\Delta \phi = 2\pi f \left( T_m - \frac{T_{i-1} + T_i}{2} \right) = +\pi f [2T_m - (T_{i-1} + T_i)] \qquad (9)$$

After this weighting operation, the processed vector (—) which in the general case has therefore undergone a homothetic transformation followed by a rotation (—) has become a vector equipollent to a vector appearing at the input of the system in the presence of a pure Doppler frequency.

The signals obtained after weighting are processed in conventional manner in filters, then rectified and applied for example to a visual display or processing device.

FIG. 1 shows only part of a receiver of a Doppler radar provided with our improved moving-target visualizer, whose intermediate-frequency stage has an output S which is also the input of the visualizer. Terminal S is connected to two demodulators 1a and 1b which receive the signal from the intermediate-frequency stage along with a reference signal available at a terminal R, the latter signal being phase-displaced by $\pi/2$ in a circuit 11 before being applied to demodulator 1b. The signals from demodulators 1a and 1b in this way constitute the two quadrature components of the vector representing the signal appearing at input S. The reference-frequency transpositions performed upstream of the intermediate-frequency stage are such that for a fixed echo the signal present at terminal S has a constant phase relative to the reference signal; a coherent oscillator is used for the generation of this signal in the case of random-phase transmission.

At the output of the demodulators, signals X and Y which are the components of signals U considered hereinbefore are digitally coded in circuits 2a and 2b at a sampling frequency $f_e$ whose value is selected on the basis of the bandwidth of the radar receiver. The digitized, preferably binary-coded signals $A_x$ and $A_y$ so obtained are respectively applied to two delay devices 3a, 3b followed by subtractors 4a, 4b. A direct connection between the outputs of the coding devices 2a, 2b and the subtractors 4a, 4b bypasses the delay circuits 3a and 3b.

The delay devices can be either shift registers or a random-access memory. The system described so far makes it possible to subtract from each other two signals $A_x$ and $A_y$ corresponding to two successive repetition periods, it being understood that the signals simultaneously present at the two inputs of each of the two subtractors 4a, 4b are echoes corresponding to the same distance or range cell, i.e. to the same delay relative to the transmission of the outgoing radar pulse giving rise to each of these echo signals. Two digital signals $E_x$ and $E_y$ supplied by the subtractors are thus freed of the spectral line corresponding to the zero Doppler frequency which characterizes stationary targets.

The digital difference signals $E_x$ and $E_y$ are applied to a single weighting device 5 which operates in the manner described hereinbefore.

The function of weighting device 5 is therefore to perform an amplitude modulation and a phase modulation on vector components $E_x$ and $E_y$ supplied respectively by subtractors 4a and 4b. If M and $\Delta\phi$ represent these modulations, the weighting unit performs the operation $MVe^{j\Delta\phi}$ where in which $V = E_x + jE_y$.

The expression $MVe^{j\Delta\phi}$ is transformed into $$M(E_x + jE_y)\cdot(\cos \Delta\phi + j \sin \Delta\phi) = M(E_x \cos \Delta\phi - E_y \sin \Delta\phi) + Mj(E_y \cos \Delta\phi + E_x \sin \Delta\phi) \quad (10)$$

FIG. 2 diagrammatically indicates how this operation is performed. The modulator represented by device 5 has two direct channels and two crossed channels into which are introduced the parameters (available at the associated radar) needed for performing the operations of expression (10). If A, B, C and D are the input and output terminals of the weighting device 5, it can be assumed that channel AC is the cosine channel and channel BD is the sine channel. Thus, channel AC comprises an operator 12 performing the multiplication of component $E_x$ by M cos $\Delta\phi$ and an adder 13 connected to an operator 17 performing the multiplication of component $E_y$ by $-M \sin \Delta\phi$. In the same way, channel BD comprises an operator 14 performing the multiplication of component $E_y$ by M cos and an adder 15 connected to an operator 16 performing the multiplication of component $E_x$ by M sin $\Delta\phi$. Components $P_x$ and $P_y$ of the vector equipollent to the "ideal" vector are collected at the output terminals C and D of the weighting device 5.

These components are respectively processed in two sets of elements 6a-7a, 6b-7b and 8a-9a, 8b-9b which constitute filters similar to circuits 3a-4a, 3b-4b connected to the input of the weighting device and which reject the low frequencies around the zero frequency rejected by the input filters. Elements 6a-6b, 8a-8b are delay circuits and elements 7a-7b, 9a-9b are subtractors; the direct connections bypassing the delay circuits have transfer coefficients $+1$. A rectifier circuit 10 connected to the outputs of subtractors 9a-9b supplies signals which in conventional manner are transmitted to processing or visual-display circuits.

The number of filter elements included in the described circuitry is not limited to two; as stated hereinbefore, the filtering system downstream of the weighting device can be of a random type with a rejection band containing the frequency f to which the compensation system is adjusted.

We have found that the compensation of variations in the radar repetition frequency is very good in a wide frequency range around the value f for which the compensation is theoretically perfect.

We claim:

1. A method of processing incoming echo signals from a receiver of a Doppler radar for the control of a moving-target display, said radar transmitting outgoing pulses with a time-varying pulse-repetition period, comprising the steps of:

demodulating incoming echo signals from a given range cell of the radar with the aid of two coherent reference signals in relative quadrature and feeding the demodulation products to two parallel channels;

subtracting in each channel two demodulation products, derived from echo signals received in consecutive pulse-repetition periods, from each other to produce a respective difference signal;

jointly weighting concurrently produced difference signals of both channels with factors which are trigonometric functions of a selected Doppler frequency and of a numerical difference between a current pulse-repetition period and a predetermined value; and combining the weighted signals into a control signal in which the effects of the variations of said pulse-repetition period are substantially compensated at least for the selected Doppler frequency.

2. A method as defined in claim 1 wherein each of said concurrently produced difference signals is multiplied with a sine and a cosine function of a phase difference $\Delta\phi$ dependent on the selected Doppler frequency and on said numerical difference, with algebraic addition of multiplication products of both difference signals in each channel.

3. A method as defined in claim 2 wherein $$\Delta\phi = \pi f\left(T_m - \frac{T_{i-1} + T_i}{2}\right),$$

f being the selected Doppler frequency, $T_m$ being said predetermined value, $T_i$ being the duration of the current pulse-repetition period and $T_{i-1}$ being the duration of the immediately preceding pulse-repetition period.

4. A method as defined in claim 2 or 3 wherein said concurrently produced difference signals are further multiplied with a factor $M = \sin \pi fT_m/\sin \pi fT_i$ where $T_m$ is said predetermined value, $T_i$ is the duration of the current pulse-repetition period and f is the selected Doppler frequency.

5. A system for processing incoming echo signals from a receiver of a Doppler radar for the control of a moving-target display, said radar transmitting outgoing pulses with a time-varying pulse-repetition period, comprising:

first and second demodulators connected to an intermediate frequency stage of the Doppler radar and to a source of two coherent reference signals in relative quadrature for feeding demodulation products of echo signals from a given range cell of the radar to a first and a second channel;

arithmetic means in each of said channels for subtracting two demodulation products, derived from echo signals received in consecutive pulse-repetition periods, from each other to produce a respective difference signal; and weighting means with inputs connected to said channels and with outputs emitting respective components of a control signal in which the effects of the variations of said pulse-repetition period are substantially compensated at least for a selected Doppler frequency, said weighting means including a first pair of multipliers connected in parallel to said first channel, a second pair of multipliers connected in parallel to said second channel, a first adder inserted between one multiplier of each pair and one of said outputs, and a second adder inserted between the other multiplier of each pair and the other of said outputs, the multipliers of each pair respectively weighting each difference signal from the corresponding channel with a sine and a cosine function of a phase difference $\Delta\phi$ dependent on the selected Doppler frequency and on a numerical difference between the current pulse-repetition period and a predetermined value.

6. A system as defined in claim 5 wherein said first adder receives difference signals weighted by $M \cos \Delta\phi$ and by $-M \sin \Delta\phi$ from two of said multipliers connected to said first and said second channel, respectively, said second adder receiving difference signals weighted by $M \sin \Delta\phi$ and by $M \cos \Delta\phi$ from the other two of said multipliers connected to said first and said second channel, respectively, with $M = \sin \pi f T_m / \sin \pi f T_i$ and $$\Delta\phi = \pi f \left( T_m - \frac{T_{i-1} + T_i}{2} \right),$$

f being the selected Doppler frequency, $T_m$ being said predetermined value, $T_i$ being the duration of the current pulse-repetition period and $T_{i-1}$ being the duration of the immediately preceding pulse-repetition period.

7. A system as defined in claim 5 or 6, further comprising filtering means connected to each output of said weighting means for suppressing Doppler frequencies close to zero, and a rectifier circuit inserted between said filtering means and the moving-target indicator.

* * * * *